Figure 1:
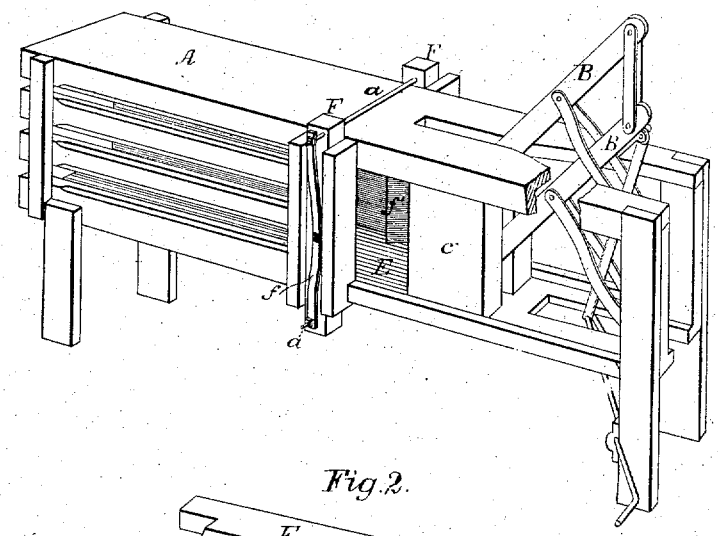

P. K. DEDERICK.
Baling-Press

No. 8,311. Reissued July 2, 1878.

WITNESSES
W. C. Jordinston
Wm. Blackstock.

INVENTOR
Peter K. Dederick,
By Hill & Ellsworth
His Attorneys.

UNITED STATES PATENT OFFICE.

PETER K. DEDERICK, OF ALBANY, NEW YORK.

IMPROVEMENT IN BALING-PRESSES.

Specification forming part of Letters Patent No. 177,217, dated May 9, 1876; Reissue No. 8,311, dated July 2, 1878; application filed April 26, 1878.

*To all whom it may concern:*

Be it known that I, PETER K. DEDERICK, of Albany, in the county of Albany and State of New York, have invented an Improvement in Hay-Presses, of which the following is a specification:

My invention consists in certain improvements in the baling-press heretofore patented to me, said improvements consisting in certain details of construction more fully set forth and particularly claimed in this specification, and illustrated in the drawing hereto attached, in which—

Figure 2:
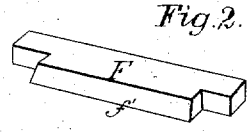

Figure 1 is a perspective view of my baling-press with the improvements herein described. Fig. 2 represents one of the folder-bars detached.

The frame-work of the baling-press, to which my improvements are applied, may be constructed in any suitable manner, or as shown in the drawing. The bale-chamber, with its tying-slots, and the traverser are essentially the same as shown in previous patents granted me on this machine.

In the drawing, *c* is the traverser. (Seen through the opening in the side of the press-box.) Pivoted thereto, one in vertical line above the other, are two bars, B B, connected by a loosely-pivoted tie-bar, so that the bars, in whatever relative position to the frame, always remain in lines parallel to each other. To each of these, at proper distance from the traverser to form suitably-operating toggle-levers, is pivoted another bar, shown in the drawings as double, for greater strength and efficiency of action. The lower and outer ends of these double bars are pivoted to the posts or other suitable part of the frame. To the outer end of the lower bar B is attached a pitman, which, at its lower end, is connected with a crank, to which motion may be imparted by any suitable machinery. It is required that the parts be so proportioned to each other that when the crank reaches its lowest limit the toggle-bars shall be drawn down into a nearly or quite horizontal position, and the traverser pushed forward as far as it need go. On either side of the press-box, and in rear of the bale-chamber, are two vertical slots or openings, fitted to receive folder-bars F. One of these bars is shown more clearly in Fig. 2. It is formed with a part, *f'*, which projects into the press-box. This extension *f'* is made in wedge-shape, and it is arranged in place in the box, as shown in Fig. 1 at F F. The wider edge of the projection is placed forward toward the bale-chamber, and the slope of the face is toward the traverser. These folder-bars may move in guides, as represented, and may be flexibly held together by bars *a a*, which pass through the ends of the bars outside the box, and through the ends of semi-elliptical springs *f*.

The depth of the projections *f' f'* and the inclined face thereon are such, and the bars are so held together by the rods and springs, that the inclined faces normally project into the box, but may be pushed back by the forward movement of the traverser.

Instead of the semi-elliptical springs, of course spiral or any other suitable springs could be employed.

The retainers, such as have been previously patented by me in connection with this press, may be attached back of the folding-bars, to assist them in their operation.

E E are openings made in the sides of the press-box, through which the material to be baled is fed.

The advantage of arranging these openings at the sides instead of on top, as in my former presses, is that it enables a single attendant to stand upon the ground, bring the hay himself, and pitch it directly into the press-box, thus dispensing with the use of platform or scaffolding, and with the services of an assistant to pitch the hay upon said platform. The one attendant is also from his position enabled to tie off the bales as they are formed. In fact, he is enabled to perform all the operations alone.

In the operation of this improved press power is applied to the levers by means of the crank, as shown, or by any other suitable method, and the traverser moved back and forth. When drawn backward a forkful of hay may be thrust through the open side E of the box, and pressed forward by the traverser in its forward motion. Obviously the hay may be passed in on either side of the box, an opening, E, being on each side. It is pressed by each stroke of the traverser past the folder-bars, forcing them back, and entering into the bale-chamber. As the traverser returns the folder-bars move forward into the box by the action of the springs, and thus fold toward the center of the box whatever of the hay or other material pressed may have overlapped the sides of the traverser, and, in addition to this, retaining the pressed material in place. This operation is continued until a bale is formed of suitable size within the chamber, when the ordinary partition-follower of my continuous press may be inserted through the side, and the operation repeated, and the bales tied and ejected in the ordinary manner.

Having thus described my invention, what I claim, and desire to secure by Letters Patent of the United States, is—

1. The parallel toggles, operating in connection with the frame, pitman, and crank, and the traverser of the continuous press, as and for the purposes set forth.

2. A procumbent or horizontal baling-press, having a feed-orifice at its side, in combination with a reciprocating traverser, C, and bale-chamber A.

P. K. DEDERICK.

Witnesses:
E. A. ELLSWORTH,
WM. BLACKSTOCK.